United States Patent
Gehrke et al.

(10) Patent No.: US 6,752,657 B2
(45) Date of Patent: Jun. 22, 2004

(54) CABLE AND CONNECTOR SYSTEM FOR OPTICAL AND ELECTRICAL SIGNALS

(75) Inventors: James K. Gehrke, Lake in the Hills, IL (US); Daniel R. Schroeder, Carol Stream, IL (US); Robert R. Kornowski, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 65 days.

(21) Appl. No.: 10/266,782

(22) Filed: Oct. 8, 2002

(65) Prior Publication Data

US 2004/0067683 A1 Apr. 8, 2004

(51) Int. Cl.[7] .............................................. G05B 6/44
(52) U.S. Cl. ...................................... 439/577; 385/101
(58) Field of Search .............................. 439/577, 404; 385/101, 92, 88, 89

(56) References Cited

U.S. PATENT DOCUMENTS

| | | | | |
|---|---|---|---|---|
| 4,678,264 A | * | 7/1987 | Bowen et al. | ................ 385/89 |
| 5,109,452 A | * | 4/1992 | Selvin et al. | ................ 385/69 |
| 6,588,938 B1 | * | 7/2003 | Lampert et al. | ............... 385/58 |

OTHER PUBLICATIONS

James K. Gehrke, Daniel R. Schroeder, and Robert R. Kornowski, "Deformable Optical Interconnect Light Guide", Disclosure CMO1893G, May 21, 2001.

* cited by examiner

Primary Examiner—Neil Abrams
(74) Attorney, Agent, or Firm—Fitch, Even, Tabin & Flannery

(57) ABSTRACT

A connection system for providing multiple modes of electromagnetic connection to a device. This system includes a ribbon cable with a plurality of multi-mode electromagnetic conductors arranged in a serial array, one alongside the other including a central optical conductor disposed between a pair of electrical conductors. The system also includes a multi-mode electromagnetic connector, that includes a housing, and optical transducers disposed between a pair of electrical terminals that have insulation piercing free ends. A cover that latchingly engages the housing applies pressure to the ribbon cable, forcing the ribbon cable to be pierced by the upper ends of the terminals and pressing the optical conductor into optical communication with said transducers. The electrical conductors carry electrical power comprising alternating current, at a frequency ranging between 10 and 30 kHz.

30 Claims, 2 Drawing Sheets

CABLE AND CONNECTOR SYSTEM FOR OPTICAL AND ELECTRICAL SIGNALS

BACKGROUND OF THE INVENTION

1. Field of the Invention

The present invention pertains to cable and connector systems, which accommodate different types of electromagnetic signals, and in particular to optical and electrical signals.

2. Description of the Related Art

Modern signal and power bus systems, i.e., remote sensing and control technologies are becoming increasingly popular with the advent of digital circuitry and communication techniques. Analog, hard-wired forerunners to these technologies may be found in commercial locations where business needs require an isolated data bus within the facility to provide a LAN for communication or monitored for intrusion or fire. In these types of systems, electrical signals sent by a variety of detectors are transmitted over dedicated cable pairs of a traditional telephone system. Although, attempts have been made to couple various types of detectors with a common cabling of metallic conductors, a need still exists for efficient multi-mode cabling systems, compatible with modern communication systems.

SUMMARY OF THE INVENTION

The present invention provides a cable and connector system for accommodating both optical and electrical modes of electromagnetic communication. Cable and connector systems according to principles of the present invention provide a reduction in site installation costs. Preferably, a cable carrying both optical and electrical conductors is assembled in the form of a flat configuration often referred to as a "ribbon cable" configuration. The cable and connector system allows simple cost effective cable installation and module connection at various points to the multimode, i.e., optical and electrical buses provided by the cable. Preferably, the electrical bus provides power for modules such as distributed modules of a communication system or other sensors, distributed throughout the installation site. Data is carried by the optical conductor which operates as an optical data bus linking the installed modules.

DETAILED DESCRIPTION OF THE PREFERRED EMBODIMENTS

Figure 1:
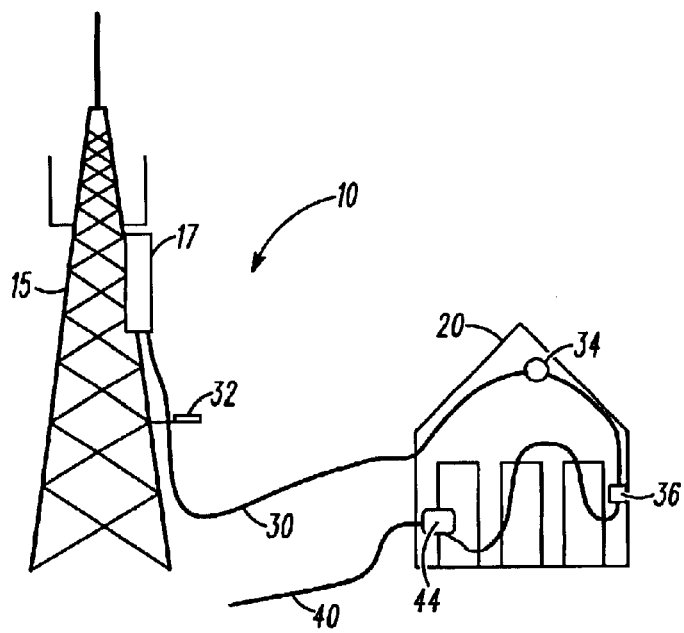
FIG. 1 is a schematic view of an installation site according to principles of the present invention.

Referring now to the drawings, and initially to FIG. 1, a site location is generally indicated at 10. The present invention has found immediate application for use in a commercial radio site controller installation. Included is a radio antenna 14 on tower 15 operated under control of supervisory systems located within a housing structure 20. The housing structure 20 accommodates equipment and personnel and is suitable for operation in a relatively remote environment. Those skilled in the art will readily appreciate that the present invention could also be employed with other types of site locations, such as residential dwellings and commercial structures, such as those located in an urban business district.

Indicated in FIG. 1 is cable 30 interconnecting a number of modules including a GPS receiver 32, a temperature alarm 34 and a door alarm 36 and a tower top communication module 17. The cable 30 provides a connector system for signal distribution such as site time/frequency reference and site diagnostic signals, such as those transmitted by alarm 34. In addition, other modules could be added to sense power outages as well as the environmental temperature module 34 environmental conditions, such as humidity, and the presence of water indicating a flooding condition. Modules could also sense the presence of certain predefined gases present in housing 20. In the preferred embodiment, signals from the various modules are carried cable 30 throughout the site location and are resolved or converted for transmission on an outgoing conventional telecommunications T-1 line 40.

According to one aspect of the present invention, it is preferred that the data signals be communicated in an optical domain or mode. As will be seen herein, cable 30 includes an optical conductor for the data. As contemplated herein, the term "optical conductor" includes virtually any media for transmitting optical signals. Included are various types of light pipe material such as glass, fiberglass, LEXAN materials, and polycarbonate or other polymeric compositions. Cable 30 constructed according to the principles of the present invention is preferably flexible so as to conform to bends which are common to most cabling installations, particularly installations within a building structure. Accordingly, it is preferred that all of the components of the cable, including the optical conductor contribute to the flexible bending ability of the cable. Although rigid optical conductors could be employed in some instances, it is generally preferred that the optical conductors be made of a flexible or bendable material, such as polymeric and other "plastic" materials. Optical signals carried by bus 30 are converted at site control and converter module 44 for transmission along T-1 line 40. It is generally preferred that bus 30 and the optical circuit associated therewith be used for local service at the installation site and that the T-1 line or other conventional communication be used for transmission to a location remote from the installation site.

Figure 2:
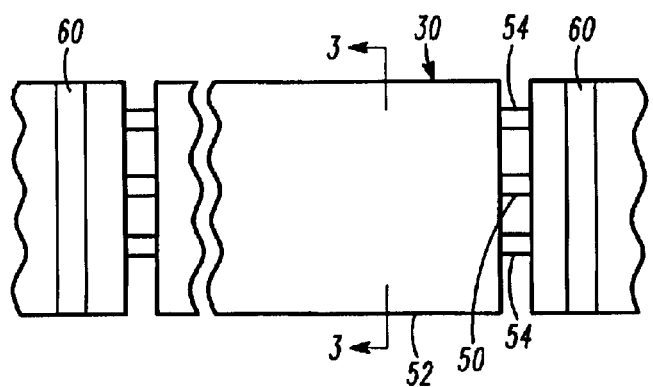
FIG. 2 is a top plan view of a cable and connector system according to principles of the present invention.
Figure 3:
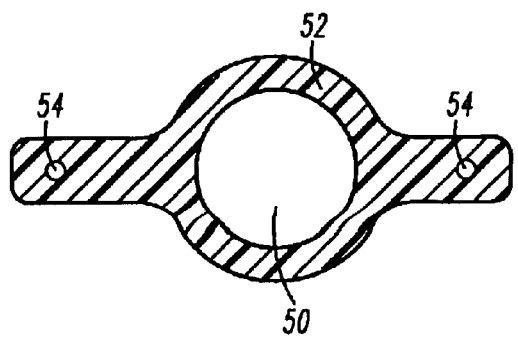
FIG. 3 is a cross-sectional view taken along the line 3—3 of FIG. 2.

Turning to FIG. 2, a portion of cable 30 is illustrated. In it's preferred form, cable 30 includes a centrally located optical conductor, light pipe, optical fiber, light guide or other optical conductor designated at 50. Optical conductor 50 transmits optical signals in a preferred bandwidth of approximately 10–100 MHz. Referring to FIG. 3, the optical conductor 50 is enclosed in an outer, flexible sheath 52 formed of suitable flexible dielectric material such as plastics and plastic compositions. Disposed on either side of optical conductor 50 are conventional metallic conductors 54 of solid stranded or braided copper wire or other conventional construction. If desired, a plurality of electrical conductors can be disposed to one side of the optical conductor, with provision for the additional electrical conductors being made in the multi-mode connector described below. In FIG. 2, portions of sheath 52 have been removed for illustrative purposes to expose the interior optical conductor 50 and the outer metallic conductors 54.

As with the optical conductor 50, metallic conductors 54 carry electromagnetic signals. However, it is preferred that metallic conductors 54 carry power signals and that data signals are restricted to optical conductor 50. Power for the modules 32, 34 and 36 mentioned above with respect to FIG. 1 receive power from electrical conductors 54. It is generally preferred that the modules include respective power transformers with the electrical conductors 54 transmitting higher frequency alternating current power signals, substantially higher than 60 Hz, so as to reduce the size and weight of power transformers associated with the modules serviced by cable 30. Although it is desired that power conductors 54 transmit alternating current power, they could also be employed to carry direct current power if such is desired due to special site considerations.

In the preferred embodiment, alternating current power signals carried by electrical conductors 54 operate at a frequency between 5 and 50 kHz, and most preferably in a range between 15 and 30 kHz. It is generally preferred that substantially higher frequencies are not employed for power distribution in order to limit the effects of radio frequency interference with surrounding equipment. However, if desired substantially higher frequency power signals can be employed if interference is not a problem. It is generally preferred that modules serviced by cable 30 receive power through transformer coupling for a more efficient electrical power distribution in addition to avoiding ground potential gradients, as well as surges induced for example by lightning strike.

Figure 4:
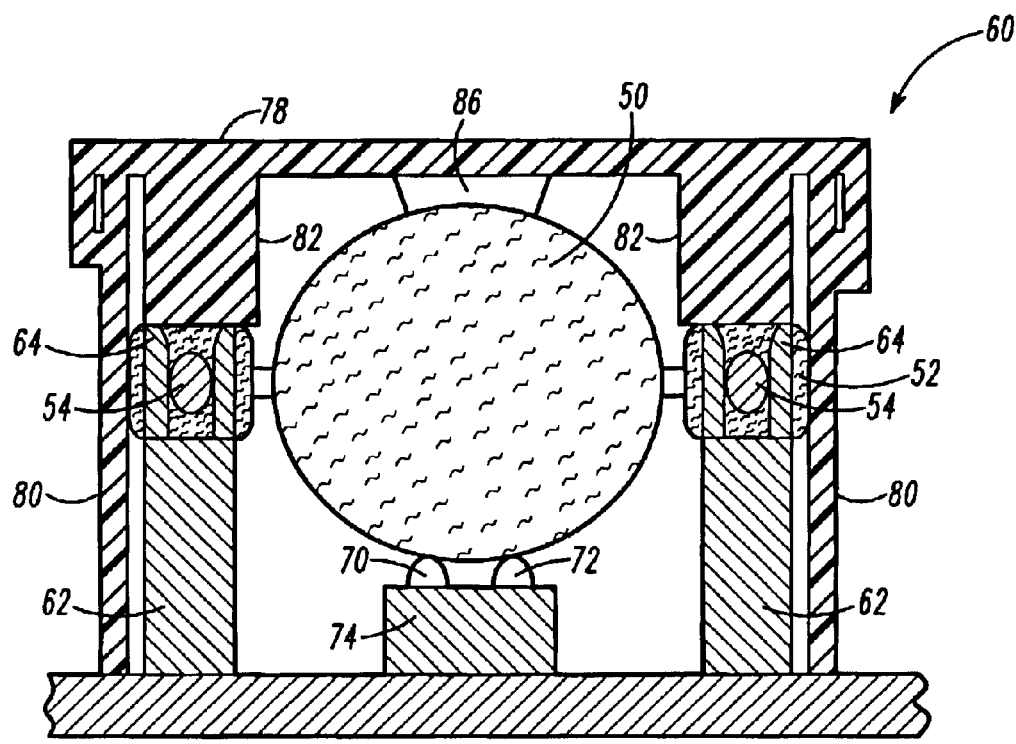
FIG. 4 is a cross-sectional view of a multi-mode connector making optical and electrical connector making optical and electrical connection to the cable.

In carrying out the present invention, it is generally preferred that contact is made to electrical conductors in cable 30 without breaking the cable and that contact is made to both optical and electrical conductors without requiring elaborate termination connectors. As shown in FIG. 2, the cable portion is illustrated in conjunction with two connectors 60. Referring to FIG. 4, connector 60 includes metallic terminals 62 having upper ends 64 of a fork configuration for piercing portions of sheath 52 surrounding metallic conductors 54. Terminals 62 are constructed according to conventional insulation piercing or insulation displacement techniques. Electrical connections to terminal 62, not shown in the figure, are provided in a conventional manner. If additional electrical conductors are provided by cable 30, a corresponding number of additional insulation displacing terminals are provided, each terminal constructed according to the manner illustrated.

In FIG. 4, access has been gained to optical conductor 50 for optical coupling with optical transducers 70, 72, which are preferably mounted within a common body 74. In FIG. 4, a locking cap 78 lockingly interengages connector sidewalls 80 in a manner, which maintains downward pressure on the cable components, especially the optical conductor. For example, inner fingers 82 press down on the sheath material immediately above electrical connectors 54, forcing the forked ends 64 of terminal 62 to pierce the sheath, with the forked ends coming into electrical contact with electrical conductors 54. A central inner finger 86 pushes either directly or indirectly on the top of optical conductor 50 causing the bottom portion of the optical conductor to maintain optical communication with transducers 70, 72. The transducers 70, 72 in turn are connected to external circuitry not shown in the figure.

Figure 5:
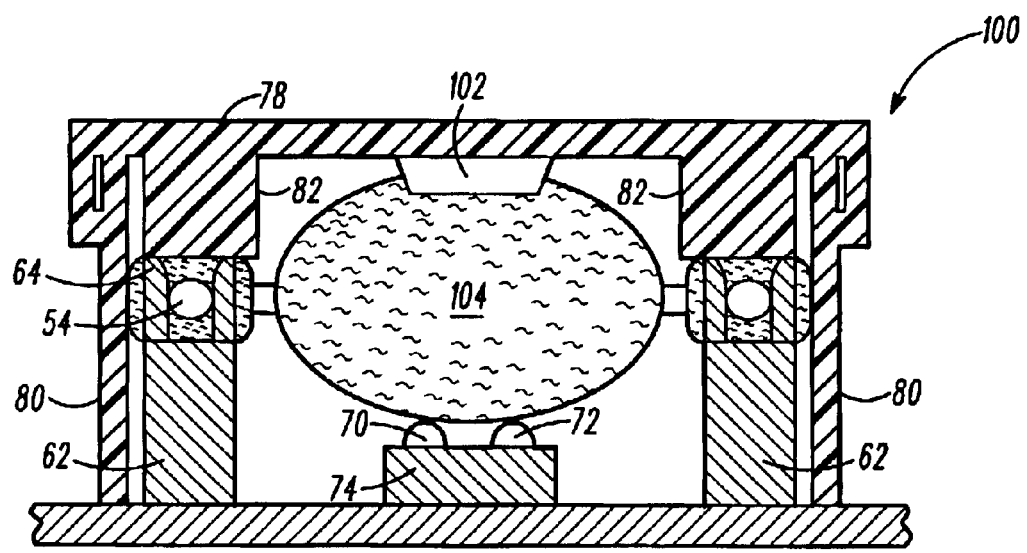
FIG. 5 is a cross-sectional view similar to that of FIG. 4 but showing a connector arrangement in which the optical conductor is deformed.

Turning now to FIG. 5, a multi-mode connector 100 and optical conductor 110 are shown. Multi-mode connector 100 is in several respects similar to multi-mode conductor 60 described above with reference to FIG. 4. One difference is the inclusion of a longer central finger, designated at 102, dimensioned so as to distort the relaxed cross-sectional shape of optical conductor 104. Preferably, optical conductor 104 is made of a material which more readily deforms under pressure, causing the optical conductor to take on the generally oval shape illustrated in FIG. 5. This changes the angle of contact between the lower surface of the optical conductor and the transducers 70, 72 causing contact angles closer to 90° than the arrangement illustrated in FIG. 4 where the optical conductor remains virtually undistorted from its relaxed, circular cross-sectional shape. If necessary, the walls 80 of the connector can be shortened to insure the desired compression of the optical conductor.

Several variations are contemplated. For example, FIGS. 1–4, show electrical conductors 54 totally encapsulated by sheath material. Referring to FIG. 4, the distance between the outer surface of optical conductor 50 and the electrical conductors 54 can be reduced such that the optical conductor itself provides the majority of the dielectric insulation between the electrical conductors. In those applications where the optical circuitry is not excessively degraded, the forked ends 64 of terminal 62 can make direct contact with the lateral surface portions of the optical conductor. As can be seen in the cross-sectional view of FIG. 4, it is generally desired that the diameter of optical conductor 50 be substantially greater than the diameter of electrical conductors 54. Assuming that penetration of terminal 62 into the laterally opposed sides of optical conductor 50 is not objectionable, the portions of sheath 52 between electrical conductors 54 and optical conductor 50 can be significantly reduced or eliminated. It is generally desirable that sheath 52 surrounds both the optical conductor and the electrical conductors as indicated in FIG. 3 in order to fix the multi-mode (i.e., optical and electrical) conductors in the desired flat or ribbon cable geometry. It should be noted that while the optical conductor provides electrical insulation for the outer electrical conductors 54, in a mechanical sense the outer electrical conductors provide mechanical shielding or protection for the more sensitive optical conductor. When arranged in the preferred flat or ribbon cable arrangement, the overall cable construction can be easily curved and bent to follow practical site installation constructions.

In application, the modules are provided with the multi-mode connectors 60 or 100, with cable 30 running continuous, and unbroken through the various modules. The cover or latch 78 of the connector is removed and the cable is positioned in the manner indicated in FIGS. 4 or 5. The cover then is inserted to apply downward pressure to the cable causing the optical and electrical multi-mode connections between the cable and the modules being serviced. Thus, a connector system is provided which allows quick attachment to the bus cable by a simple compression latch similar to that of existing insulation displacement of electrical connectors. The inner fingers are provided to apply pressure on top of the optical conductor, opposite the location of optical transducers 70, 72. The inner fingers provide contact between the bottom side of the optical conductor and the transducers as is needed to optical signal communication between the transducers and the optical conductor. With the present invention, substantial savings in site cabling and surge suppression costs can be employed with a cabling and surge suppression system having a data portion immune to EMI transients and a power system which does not produce RF interference.

While the principles of the invention have been described above in connection with a specific apparatus, it is to be clearly understood that this description is made only by way of example and not as a limitation on the scope of the invention.

What is claimed is:

1. A connection system for providing multiple modes of electromagnetic communication, comprising:

a ribbon cable comprising a plurality of multi-mode electromagnetic conductors arranged in a serial array, one alongside the other, comprising a central optical conductor disposed between a pair of electrical conductors; and a multi-mode electromagnetic connector, including a housing, optical transducers disposed between a pair of electrical terminals having insulation piercing free ends, a cover latchingly engaging the housing applying pressure to the ribbon cable, forcing the ribbon cable to be pierced by the upper ends of the electrical terminals and pressing the optical conductor into optical communication with said transducers.

2. The system of claim 1 further comprising a sheath covering the electrical conductors and optical conductor.

3. The system of claim 1 wherein the electrical conductors carry electrical power for the device.

4. The system of claim 3 wherein the electrical power comprises alternating current, at a frequency ranging between 10 and 30 kHz.

5. The system of claim 1 wherein the optical conductor operates at a bandwidth ranging between 10 and 100 MHz.

6. The system of claim 1 wherein said optical conductor and said electrical conductors are flexible.

7. The system of claim 6 further comprising a flexible sheath covering the electrical conductors and the optical conductor.

8. The system of claim 1 wherein said electrical conductors and said optical conductors have generally circular cross sections.

9. The system of claim 1 further comprising a system device including a transformer coupled to the electrical conductors.

10. The system of claim 9 wherein said device carries said multi-mode electromagnetic connector.

11. The system of claim 1 wherein said ribbon cable includes a plurality of electrical conductors disposed to one side of said optical conductor.

12. The system according to claim 1 wherein said electrical conductors are placed immediately adjacent said optical conductor, with said optical conductor providing electrical insulation between said electrical conductors.

13. The system according to claim 1 wherein said ribbon cable is continuous and had a uniform number and spacing of conductors throughout.

14. The system of claim 1 wherein said optical conductor has a pre-determined cross-sectional area and the electrical conductors have smaller cross-sectional areas.

15. The system of claim 1 wherein the upper ends of the electrical terminals are disposed above the optical transducers.

16. The system of claim 1 wherein the optical conductor remains substantially undistorted.

17. The system of claim 1 wherein the optical conductor is deformed under pressure from the cover.

18. The system of claim 14 the cross-sectional areas of said electrical conductors are generally the same.

19. An electromagnetic communication system comprising:

a plurality of system modules producing optical output signals;

a ribbon cable comprising a plurality of multi-mode electromagnetic conductors arranged in a generally coplanar serial array, one alongside the other, comprising a central optical conductor disposed between a pair of electrical conductors; and a plurality of multi-mode electromagnetic connectors carried by said modules, each multi-mode electromagnetic connector including a housing, optical transducers disposed between a pair of electrical terminals having insulation piercing free ends, a cover latchingly engaging the housing applying pressure to the ribbon cable, so as to force the ribbon cable to be pierced by the upper ends of the electrical terminals and so as to press the optical conductor into optical communication with said transducers.

20. The system of claim 19 wherein the electrical conductors carry electrical power for the device.

21. The system of claim 20 wherein the modules include a power transformer coupled to said electrical conductors.

22. The system according to claim 19 wherein said electrical conductors are placed immediately adjacent said optical conductor, with said optical conductor providing electrical insulation between said electrical conductors.

23. The system of claim 19 wherein said optical conductor has a pre-determined cross-sectional area and the electrical conductors have smaller cross-sectional areas.

24. The system of claim 19 wherein the optical conductor remains substantially undistorted.

25. The system of claim 19 wherein the optical conductor is deformed under pressure from the cover.

26. The system of claim 19 wherein said optical conductor and said electrical conductors are flexible.

27. A multi-mode electromagnetic connector for use with a ribbon cable comprising a plurality of multi-mode electromagnetic conductors arranged in a serial array, one alongside the other, comprising a central optical conductor disposed between a pair of electrical conductors, comprising:

an optical transducer disposed between a pair of electrical terminals;

said electrical terminals having insulation piercing free ends;

a housing supporting said electrical terminals and said optical transducer;

a cover latchingly engaging the housing so as to apply pressure to a portion of the ribbon cable passing through the housing, forcing the ribbon cable to be pierced by the upper ends of the electrical terminals and pressing the optical conductor into optical communication with said transducer.

28. The system of claim 27 wherein the upper ends of the electrical terminals are disposed above the optical transducers.

29. The system of claim 27 wherein the optical conductor remains substantially undistorted.

30. The system of claim 27 wherein the optical conductor is deformed under pressure from the cover.

* * * * *